(12) United States Patent
Woo et al.

(10) Patent No.: US 12,510,057 B2
(45) Date of Patent: Dec. 30, 2025

(54) WIND TURBINE BLADE WITH LIGHTNING PROTECTION RECEPTOR

(71) Applicant: KOREA ELECTROTECHNOLOGY RESEARCH INSTITUTE, Changwon-si (KR)

(72) Inventors: Jeong Min Woo, Changwon-si (KR); Sung Man Kang, Changwon-si (KR); Mun No Ju, Changwon-si (KR); Jae Bok Lee, Changwon-si (KR); Kyoung Joo Lee, Changwon-si (KR); Yu Min Kim, Changwon-si (KR); Ho Dong Kim, Changwon-si (KR); Kwae Hyup Nor, Changwon-si (KR); Sang Jin Kim, Changwon-si (KR)

(73) Assignee: KOREA ELECTROTECHNOLOGY RESEARCH INSTITUTE (KR)

( * ) Notice: Subject to any disclaimer, the term of this patent is extended or adjusted under 35 U.S.C. 154(b) by 0 days.

(21) Appl. No.: 18/828,133

(22) Filed: Sep. 9, 2024

(65) Prior Publication Data
US 2025/0146475 A1    May 8, 2025

(51) Int. Cl.
*F03D 80/30*   (2016.01)
*F03D 1/06*    (2006.01)

(52) U.S. Cl.
CPC ......... *F03D 80/301* (2023.08); *F03D 1/0687* (2023.08); *F03D 1/0688* (2023.08); *F03D 1/069* (2023.08); *F05B 2240/307* (2020.08)

(58) Field of Classification Search
CPC .... F03D 80/301; F03D 1/0687; F03D 1/0688; F03D 1/069; F05B 2240/307; Y02E 10/72; H02G 13/80
See application file for complete search history.

(56) References Cited

U.S. PATENT DOCUMENTS

| 2006/0126252 A1* | 6/2006 | Mortensen | F03D 80/30 361/118 |
| 2011/0142643 A1* | 6/2011 | Hardison | F03D 1/00 416/146 R |
| 2011/0142644 A1* | 6/2011 | Fritz | F03D 1/0675 416/146 R |

(Continued)

FOREIGN PATENT DOCUMENTS

| JP | 2009250040 A | 10/2009 |
| JP | 3243600 U | 9/2023 |

(Continued)

OTHER PUBLICATIONS

Korean Office Action (KR 10-2023-0152043), KIPO, Jan. 31, 2025.

*Primary Examiner* — Nathaniel E Wiehe
*Assistant Examiner* — Ayne A Lambert
(74) *Attorney, Agent, or Firm* — Park & Associates IP Law Office (57) ABSTRACT

Proposed is a wind turbine blade with a lightning protection receptor. The wind turbine blade with a lightning protection receptor is a technology that allows for excellent lightning capture rate for both negative and positive lightning by improving lightning measures for conventional wind turbines, which are vulnerable to positive lightning, in line with the increasing wind turbine heights for large-scale power generation and the trend toward offshore wind power, and that minimizes post-repair/supplementary measures by limiting blade damage/coating peeling due to lightning strikes to a narrow area, unlike in the conventional case where damage or peeling of the coating occurs over the entire area of a blade when struck by lightning on an edge wire inserted into the lateral inner side of the blade.

4 Claims, 10 Drawing Sheets

(56) References Cited

U.S. PATENT DOCUMENTS

| | | | |
|---|---|---|---|
| 2012/0003094 A1* | 1/2012 | Hansen | F03D 80/30 29/889.71 |
| 2016/0131110 A1* | 5/2016 | Livingston | F03D 1/0675 416/146 R |
| 2020/0056596 A1* | 2/2020 | Christiansen | B29C 70/72 |
| 2020/0200151 A1* | 6/2020 | Brilliant | F03D 80/30 |
| 2022/0243704 A1* | 8/2022 | March Nomen | F03D 80/30 |
| 2023/0142232 A1* | 5/2023 | Ponnada | F03D 80/30 416/223 R |
| 2023/0142518 A1* | 5/2023 | Bartha | F03D 1/0688 416/230 |
| 2023/0272779 A1* | 8/2023 | Brilliant | H02G 13/80 416/230 |

FOREIGN PATENT DOCUMENTS

| | | | | |
|---|---|---|---|---|
| KR | 1020100115139 A | 10/2010 | | |
| KR | 101141845 B1 | 5/2012 | | |
| KR | 1020190131122 A | 11/2019 | | |
| WO | WO-0177527 A1 * | 10/2001 | | F03D 80/30 |
| WO | WO-2018157929 A1 * | 9/2018 | | |

* cited by examiner

WIND TURBINE BLADE WITH LIGHTNING PROTECTION RECEPTOR

REFERENCE TO RELATED APPLICATIONS

This application claims the priority benefit of Korean Patent Application No. 10-2023-0152043 filed on Nov. 6, 2023, the entire contents of which are incorporated herein by reference.

FIELD OF THE INVENTION

The present disclosure relates to a wind turbine blade with a lightning protection receptor that allows for an excellent lightning capture rate for both negative and positive lightning by improving lightning measures for conventional wind turbines, which are vulnerable to positive lightning, in line with the increasing wind turbine heights for large-scale power generation and the trend toward offshore wind power, and that minimizes post-repair/supplementary measures by limiting blade damage/coating peeling due to lightning strikes to a narrow area, unlike in the conventional case where damage or peeling of the coating occurs over the entire area of a blade when struck by lightning on an edge wire inserted into the lateral inner side of the blade.

BACKGROUND OF THE INVENTION

Figure 1:
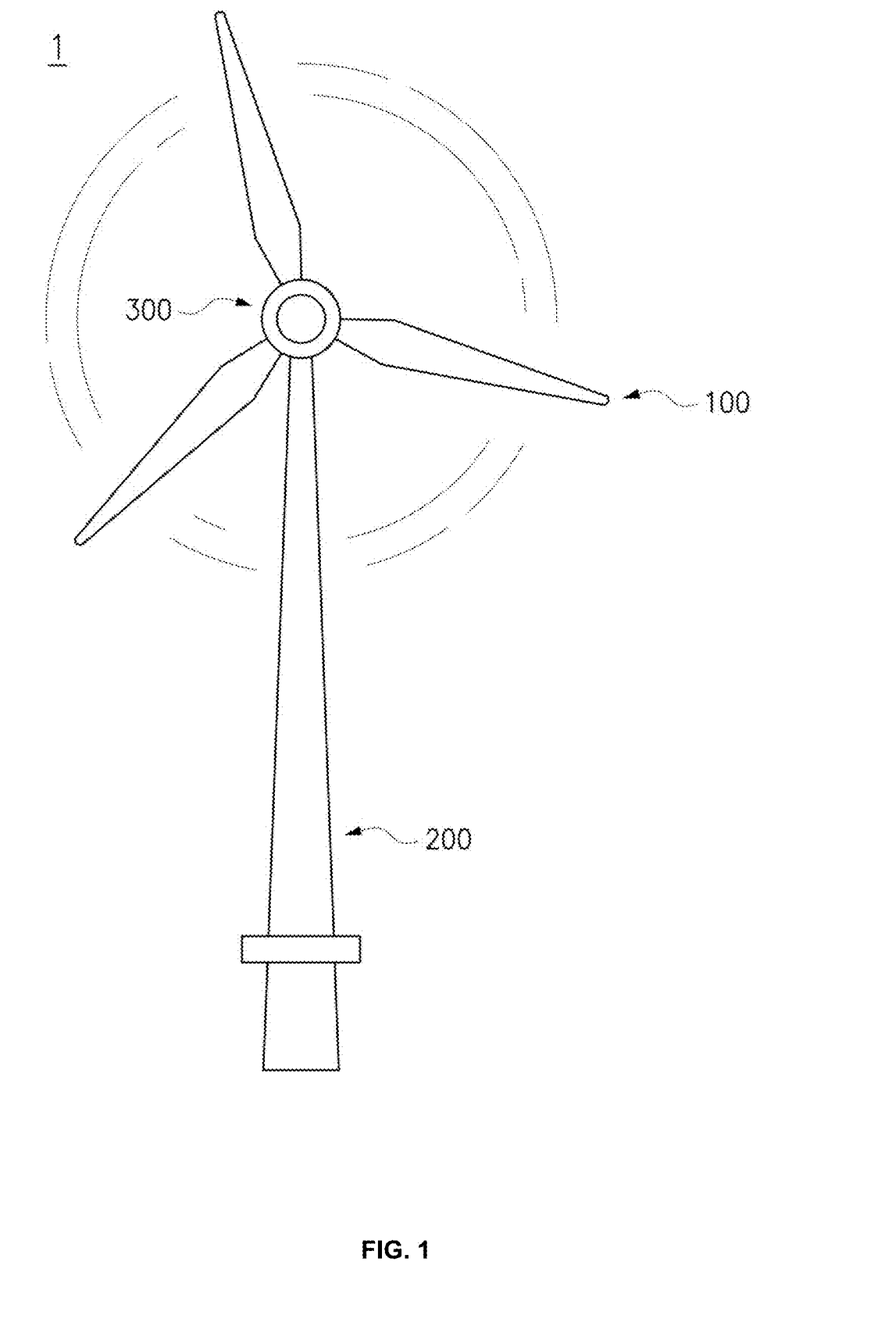
FIG. 1 is a view showing the basic configuration of a wind turbine.
Figure 2:
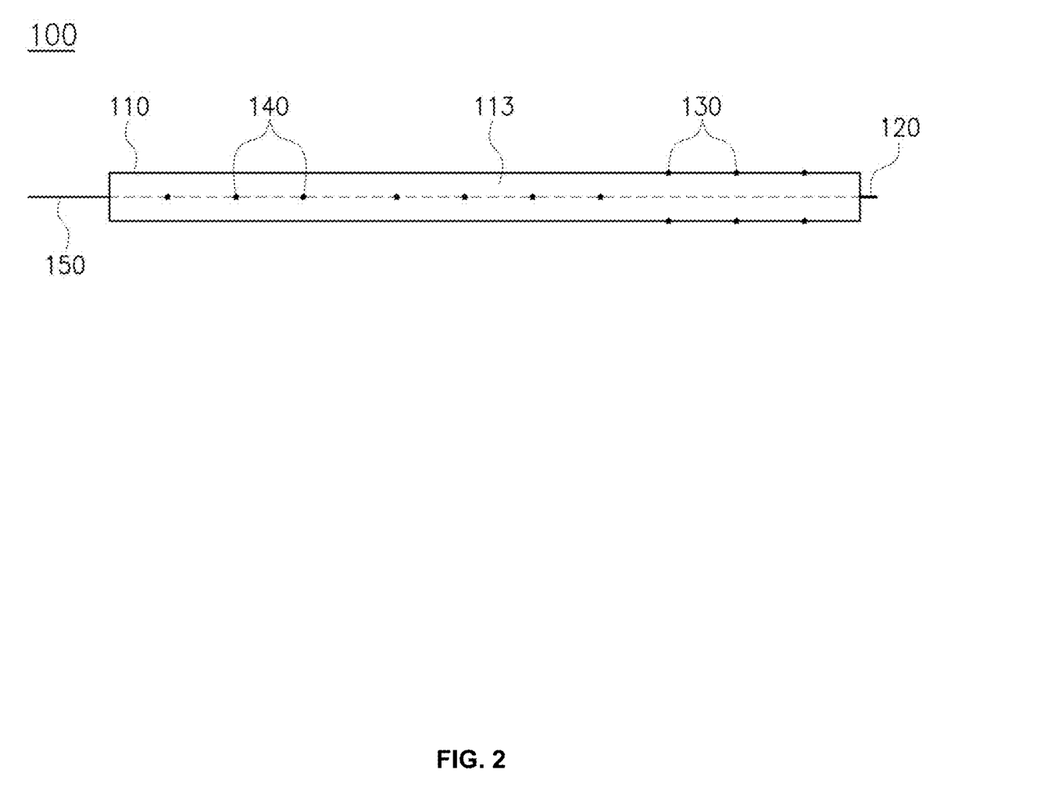
FIG. 2 is a conceptual view showing the configuration of a wind turbine blade with a lightning protection receptor according to the present disclosure.

With the global carbon reduction trend, the installation and use of wind power generators, one of the new and renewable energy generation facilities that replace thermal power generation, is spreading. In particular, large-scale wind turbines are being installed at sea or in mountainous terrain on land to increase power generation capacity. Such a wind turbine 1 installed at sea or in mountainous regions typically has a configuration in which a tower 200 of a certain height is erected, and a turbine 300 and blades 100 are arranged at the top of the tower 200 as shown in FIG. 1.

In the case of large wind turbines, the developing trend is moving from land to sea because of noise pollution and damage to the landscape. Due to limited installation locations at sea, there are efforts to install offshore wind turbines even in low wind speed areas, and attempts are being made to respond to low wind speed conditions by increasing the size of the blades of a wind turbine.

The trend toward larger offshore wind farms continues to increase the height of wind turbines, and as a result, lightning accidents occur frequently. In the open sea, wind turbines, which are tall steel structures, are always exposed to lightning strikes, and thus preparations for this are necessary. Looking at the results of lightning accidents, the lightning accident rate for blades is around 40%, but once a lightning accident occurs, a wind turbine is stopped, and if it is necessary not only to investigate the damage status but also to replace a blade, the cost of responding to the lightning accident increases significantly.

The international standard 61400-24, which outlines lightning protection measures for wind turbine blades, describes the installation and types of receptors on blades. In the actual field, complex blade tip receptors or side receptors are often installed, and in the case of large blades, lightning measures are taken by installing a metal mesh.

Meanwhile, looking at the rate of lightning accident damage by season for wind turbines in Japan, 64% occurs in winter and 36% in summer. In addition, it is reported that for wind turbines with a power rating below 1 MW (a rotor diameter less than 50 m), the damage rate is 40%, whereas for wind turbines above 1 MW, the damage rate increases to 75% (Japan, a guideline for lightning protection of wind power generation).

Lightning can have positive or negative polarity, and negative-polarity lightning occurs frequently in the summer. Generally, negative lightning occurs when negative charges present at the bottom of a thundercloud connect with the ground. In the summer, thunderclouds tend to get closer to the ground, and thus negative lightning frequently occurs.

On the other hand, positive-polarity lightning, which is mainly observed in winter in East Asia, occurs when positive charges located at the top of a thundercloud connect with the ground. Mostly in winter, when thunderclouds are located high and spread out laterally, positive charges located at the top of the thundercloud form lightning. Despite a low rate of occurrence, positive lightning has the characteristic of having a very large maximum current as the accumulated positive charges escape all at once. Positive lightning may also occur when there is a tall steel structure is located, and as the physical distance from the top of a thundercloud becomes closer.

Conventional lightning protection receptors are reported to have excellent lightning capture rates for negative lightning strikes, but are very vulnerable to positive lightning strikes. In particular, the sides of the blades of wind turbines are found to be very vulnerable.

As a lightning protection measure for the blades of wind turbines, edge wires may be used. However, since an edge wire is inserted and installed in the lateral inner side of a blade, collateral damage may occur if the coating on a blade peels off after being struck by lightning or if lightning moves along the sides of the blade (Patent Document 1) Korean Patent No. 10-1141845, "LIGHTNING PROTECTION DEVICE OF WINDMILL BLADE"

(Patent Document 2) Korean Patent Application Publication No. 10-2010-0115139 "LIGHTNING PROTECTING APPARATUS OF WIND TURBINE"

(Patent Document 3) Korean Patent Application Publication No. 10-2019-0131122 "WIND TURBINE ROTOR BLADE AND METHOD FOR PRODUCING WIND TURBINE ROTOR BLADE"

SUMMARY OF THE INVENTION

Accordingly, the present disclosure has been made keeping in mind the above problems occurring in the related art, and the present disclosure is intended to provide a wind turbine blade with a new type of lightning protection receptor that allows for excellent lightning capture rate against positive lightning, which the sides of the blade are very vulnerable to, since edge receptors placed on the edge of the blade are connected to a down conductor that passes through the center of the internal space of the blade to provide a structure in which lightning movement is induced, and that minimizes post-repair/supplementary measures by limiting blade damage/coating peeling due to lightning strikes to a narrow area.

In order to achieve the above objective, according to an aspect of the present disclosure, there is provided a wind turbine blade with a lightning protection receptor, including: a blade body 110 disposed on a top of a tower of a wind turbine 1; a tip receptor 120 provided at an outer end in a longitudinal direction L of the blade body 110; side receptors 130 provided on front and rear surfaces 111a and 111b forming a side 111 of the blade body 110; edge receptors 140 provided on an edge 112 of the blade body 110; and a down conductor 150 located in an internal space 113 of the blade body 110, and to which the tip receptor 120, the side receptors 130, and the edge receptors 140 are connected.

In the wind turbine blade with a lightning protection receptor according to the present disclosure, the side receptors 130 and the edge receptors 140 may be provided on a surface of the blade body 110 in a narrow area of less than a set size.

In the wind turbine blade with a lightning protection receptor according to the present disclosure, the side receptors 130 may be arranged at regular intervals within an area of a first arrangement distance m from the outer end in the longitudinal direction L of the blade body 110, whereas the edge receptors 140 may be arranged at regular intervals within an area of a second arrangement distance n from a point spaced apart by the first arrangement distance m from the outer end in the longitudinal direction L of the blade body 110, wherein the area of the second arrangement distance n where the edge receptors 140 are provided may have a larger value than the area of the first arrangement distance m where the side receptors 130 are provided, so that lightning may be induced to the edge receptors 140.

In the wind turbine blade with a lightning protection receptor according to the present disclosure, the number of the edge receptors 140 provided within the second arrangement distance n may be set to be greater than the number of the side receptors 130 provided within the first arrangement distance m.

In the wind turbine blade with a lightning protection receptor according to the present disclosure, the edge receptors 140 may be arranged in a line at equal intervals on the edge 112 of the blade body 110.

According to the wind turbine blade with a lightning protection receptor of the present disclosure, in line with the increasing wind turbine heights for large-scale power generation and the trend toward offshore wind power, lightning measures for conventional wind turbines, which are vulnerable to positive lightning, can be improved. That is, according to the present disclosure, excellent lightning capture rate can be achieved for both negative and positive lightning. In addition, according to the wind turbine blade with a lightning protection receptor of the present disclosure, blade damage/coating peeling due to lightning strikes is limited to a narrow area, minimizing post-repair/supplementary measures. Accordingly, wind turbines can be quickly repaired/maintained and restarted, and repair/maintenance costs can also be reduced.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, embodiments of the present disclosure will be described in detail based on the attached drawings. Meanwhile, in the drawings and detailed descriptions, illustrations and references to structures and operations that can be easily understood by those in the field are simplified or omitted. In particular, in the illustrations and detailed descriptions of the drawings, detailed descriptions and illustrations of specific technical configurations and operations of elements that are not directly related to the technical features of the present disclosure are omitted, and only the technical configurations related to the present disclosure are briefly shown or described.

A wind turbine blade 100 with a lightning protection receptor according to an embodiment of the present disclosure is designed to provide a receptor structure to improve the lightning protection of conventional wind turbines, which are vulnerable to positive lightning, in line with the increasing wind turbine heights for large-scale power generation and the trend toward offshore wind power. The wind turbine blade 100 with a lightning protection receptor includes a blade body 110, a tip receptor 120, a side receptor 130, an edge receptor 140, and a down conductor 150.

The blade body 110 is placed at the top of the tower of a wind turbine 1 and rotates by wind power to induce power generation. Large offshore wind turbines or large onshore wind turbines are built quite high from the installation surface. As a result, not only negative lightning strikes, but also positive lightning strikes occur as the physical distance between a wind turbine and the top of a thundercloud becomes closer. In response to this, the wind turbine blade with a lightning protection receptor according to an embodiment of the present disclosure has the edge receptor 140 provided on an edge 112 of the blade body 110. In addition to the edge receptor 140, the blade body 110 is also provided with the tip receptor 120 and the side receptor 130 so as to have an excellent lightning capture rate for both negative and positive lightning.

The tip receptor 120 is a receptor provided at the outer end of the blade body 110 in the longitudinal direction L.

Figure 3:
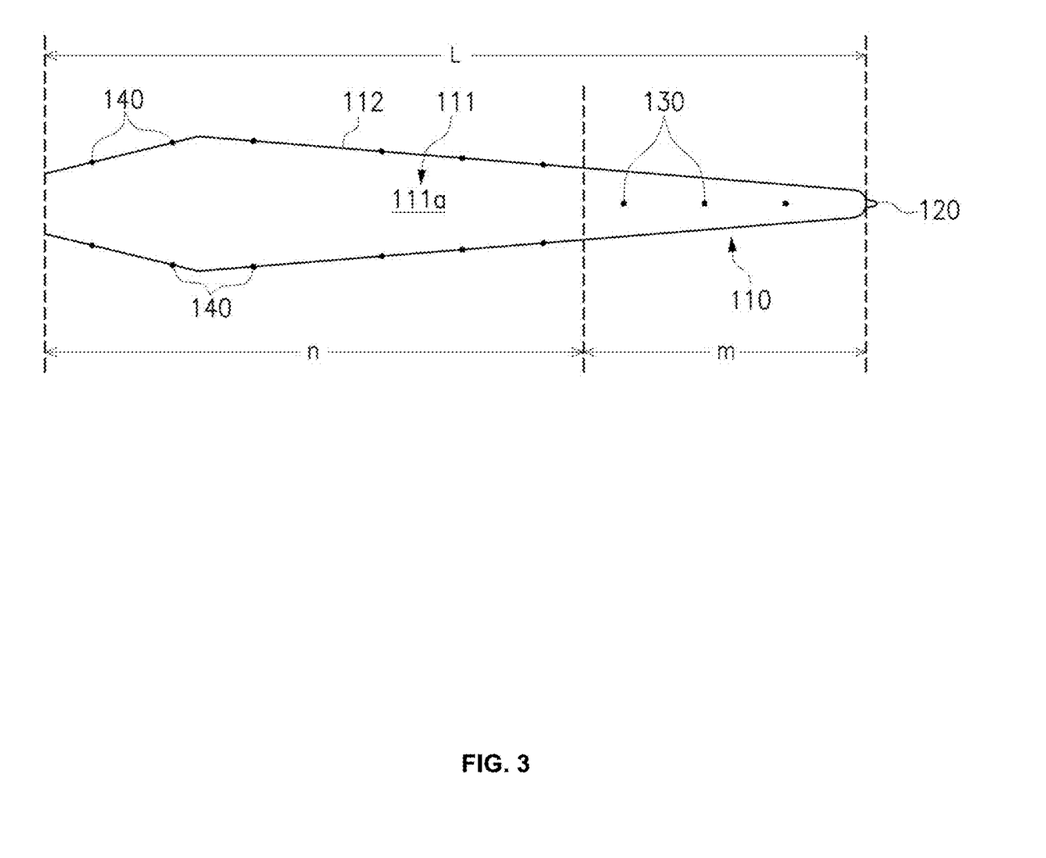
FIG. 3 is an exemplary side configuration of a wind turbine blade with a lightning protection receptor according to an embodiment of the present disclosure.
Figure 4:
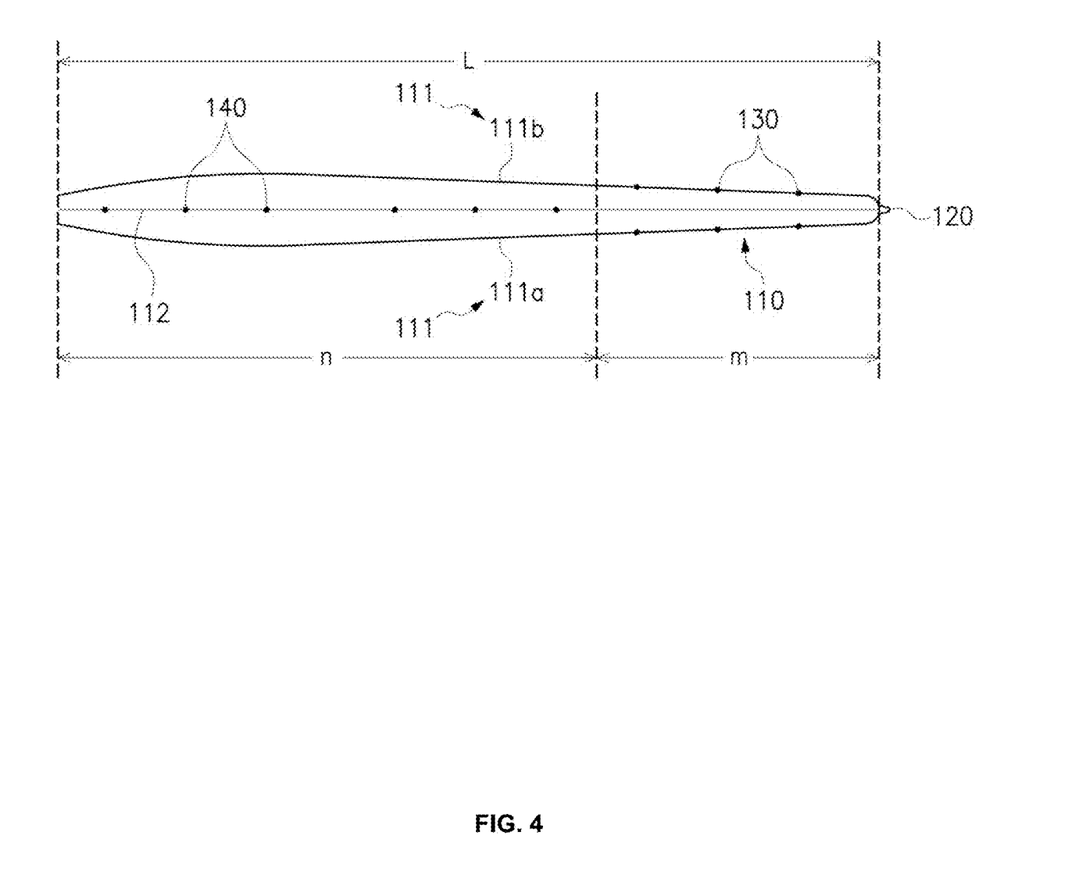
FIGS. 4 and 5 are views showing the edge configuration of a wind turbine blade with a lightning protection receptor according to the present disclosure.
Figure 5:
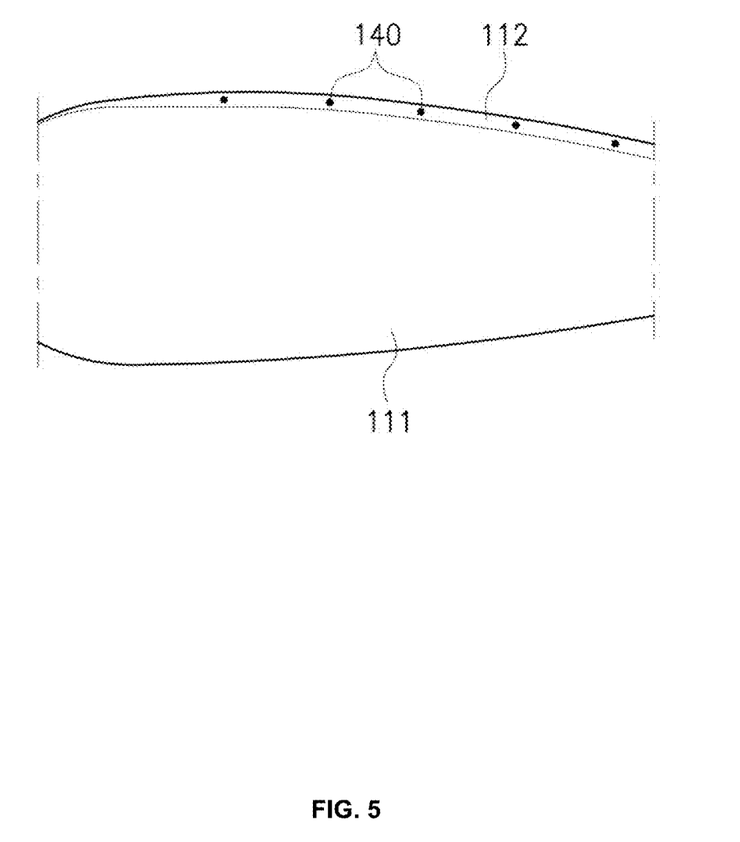
Figure 6A:
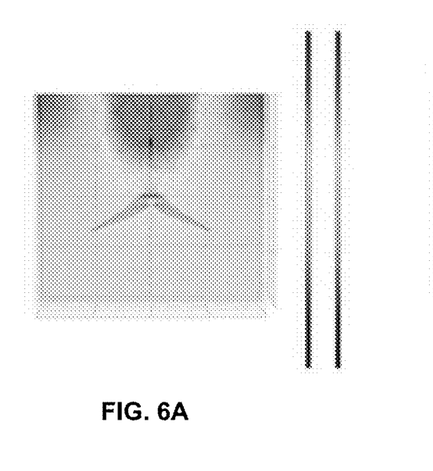
FIGS. 6A to 6F are views showing the results of simulation analysis of the blade electrostatic field of a wind turbine.
Figure 6B:
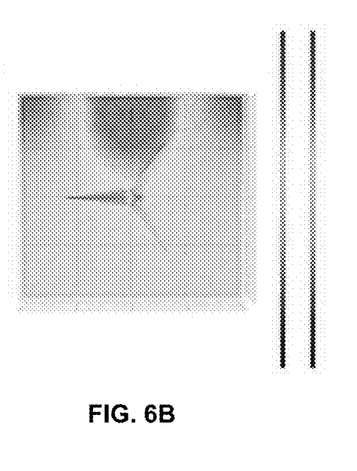
Figure 6C:
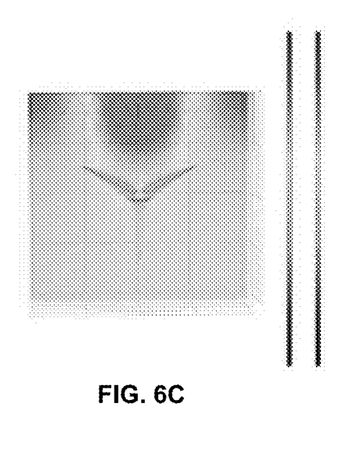
Figure 6D:
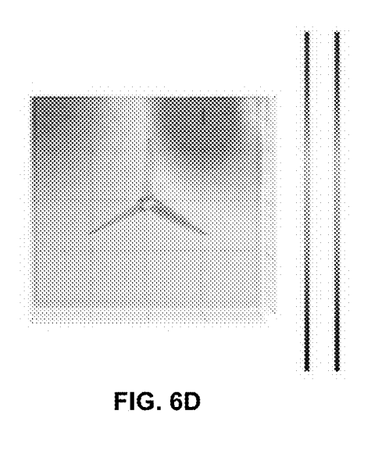
Figure 6E:
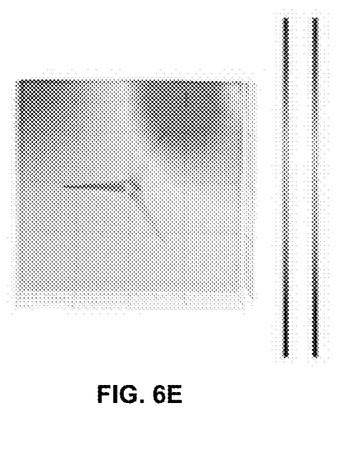
Figure 6F:
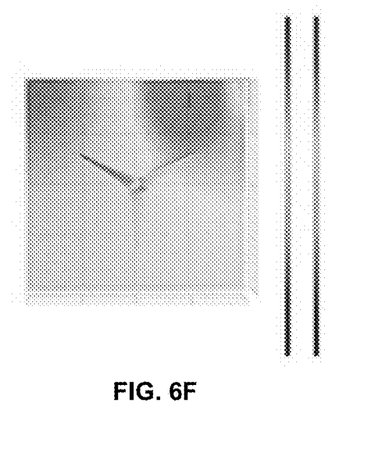

The side receptor 130 is a receptor provided on front and rear surfaces 111a and 111b of a side 111 of the blade body 110, and the edge receptor 140 is a receptor provided on the edge 112 of the blade body 110 as shown in FIG. 5. In this case, the side receptor 130 and the edge receptor 140 according to an embodiment of the present disclosure are provided on the surface of the blade body 110 in a narrow area of less than a set size as shown in FIGS. 3 and 4. Accordingly, blade damage/coating peeling due to lightning strikes is limited to a narrow area, and post-repair/supplementary measures may be minimized. The side receptor 130 and the edge receptor 140 are made of a metal material with high electrical conductivity such as copper.

Meanwhile, the side receptor 130 according to an embodiment of the present disclosure is provided in plurality, and the side receptors 130 are arranged at regular intervals within an area of a first arrangement distance m from the outer end in the longitudinal direction L of the blade body 110. The edge receptor 140 according to an embodiment of the present disclosure is also provided in plurality, and the edge receptors 140 are arranged at regular intervals within an area of a second arrangement distance n from a point spaced apart by the first arrangement distance m from the outer end in the longitudinal direction L of the blade body 110.

In this case, the area of the second arrangement distance n where the edge receptors 140 are provided has a larger value than the area of the first arrangement distance m where the side receptors 130 are provided, so that lightning is induced to the edge receptors 140.

The number of edge receptors 140 provided within the second arrangement distance n is set to be greater than the number of side receptors 130 provided within the first arrangement distance m, allowing for excellent lightning capture rate against positive lightning, which the sides of the blade are very vulnerable to.

Meanwhile, in the blade body 110 according to an embodiment of the present disclosure, the side receptors 130 are arranged in a line at equal intervals on the front and rear surfaces 111a and 111b of the side 111 of the blade body 110, and the edge receptors 140 are arranged in a line at equal intervals on the edge 112 of the side 111 of the blade body 110.

The down conductor 150 is located in an internal space 113 of the blade body 110 and is connected to the tip receptor 120, the side receptors 130, and the edge receptors 140 to induce lightning movement. In particular, since the down conductor 150 according to an embodiment of the present disclosure is disposed to pass through the center of the internal space 113 of the blade body 110, even if high-voltage current flows through the down conductor 150 as the tip receptor 120, the side receptors 130, and the edge receptors 140 take the lightning current, damage to the blade body 110 may be prevented.

FIGS. 6A to 6F are views showing the results of simulation analysis of the blade electrostatic field of a wind turbine, and it can be seen that the highest electrostatic field is measured on the sides of the blade, except in cases where the direction of the blade and the location of a thundercloud match.

Figure 7A:
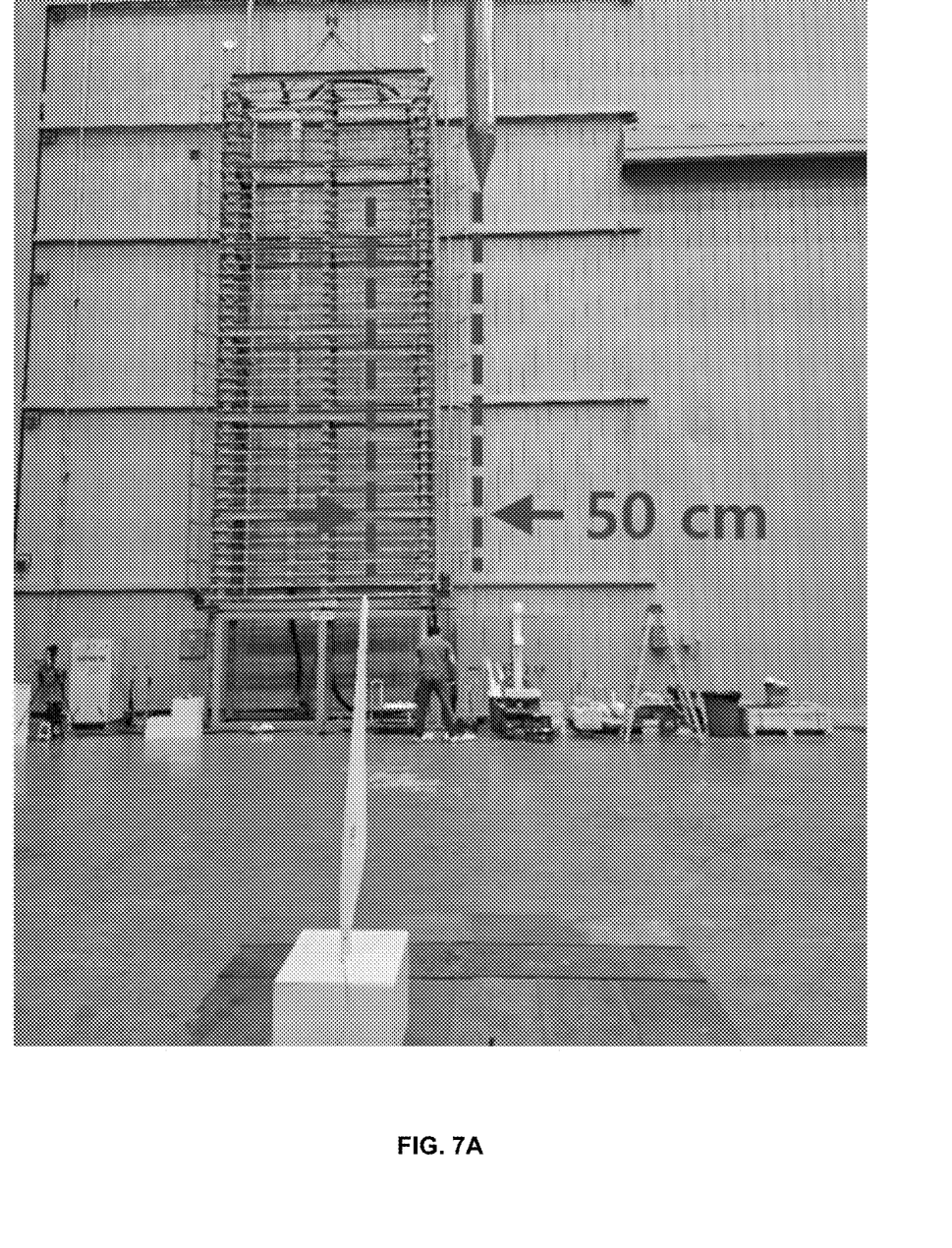
FIGS. 7A and 7B are photos showing a discharge test at a blade air-termination part according to an evaluation method described in the international standard IEC 61400-24.
Figure 7B:
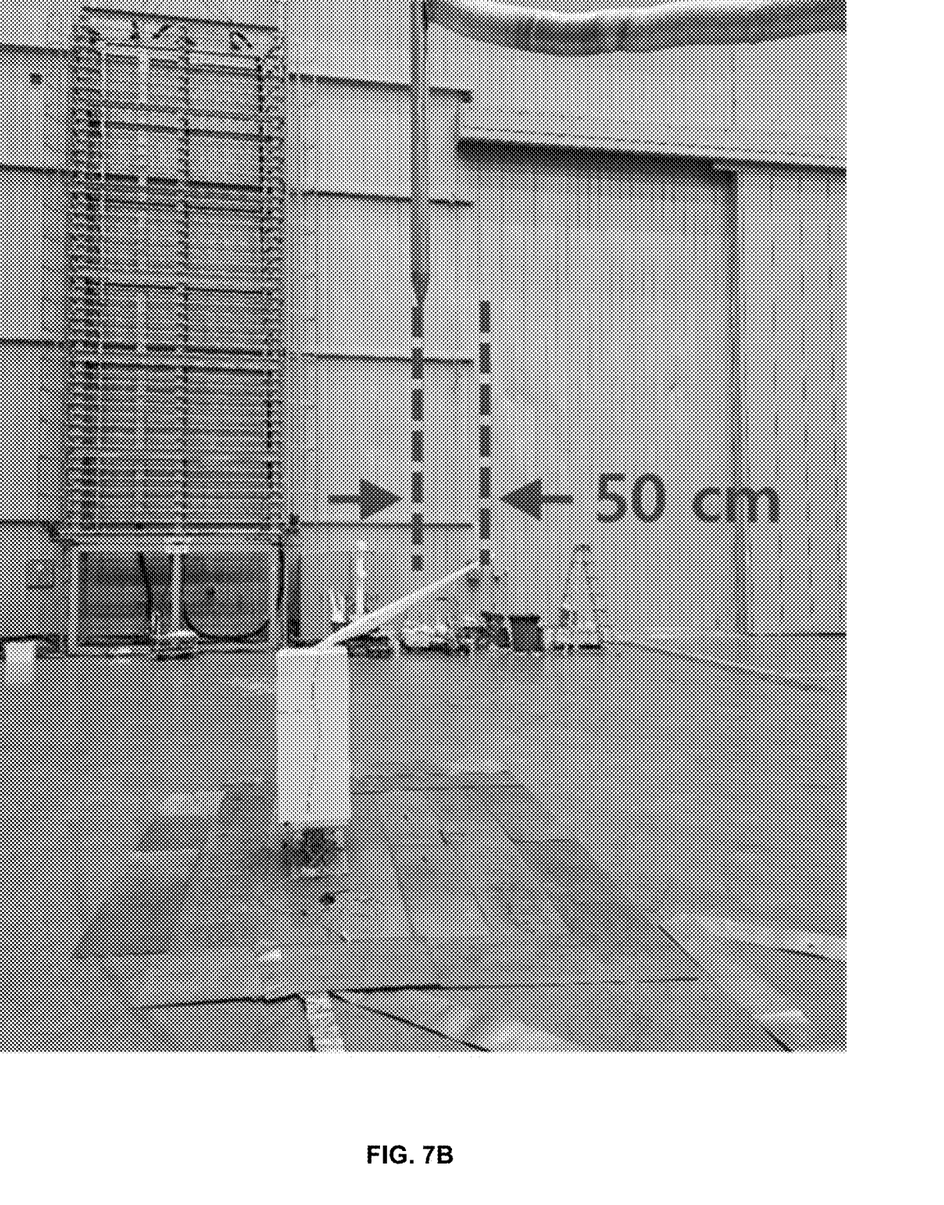
Figure 8A:
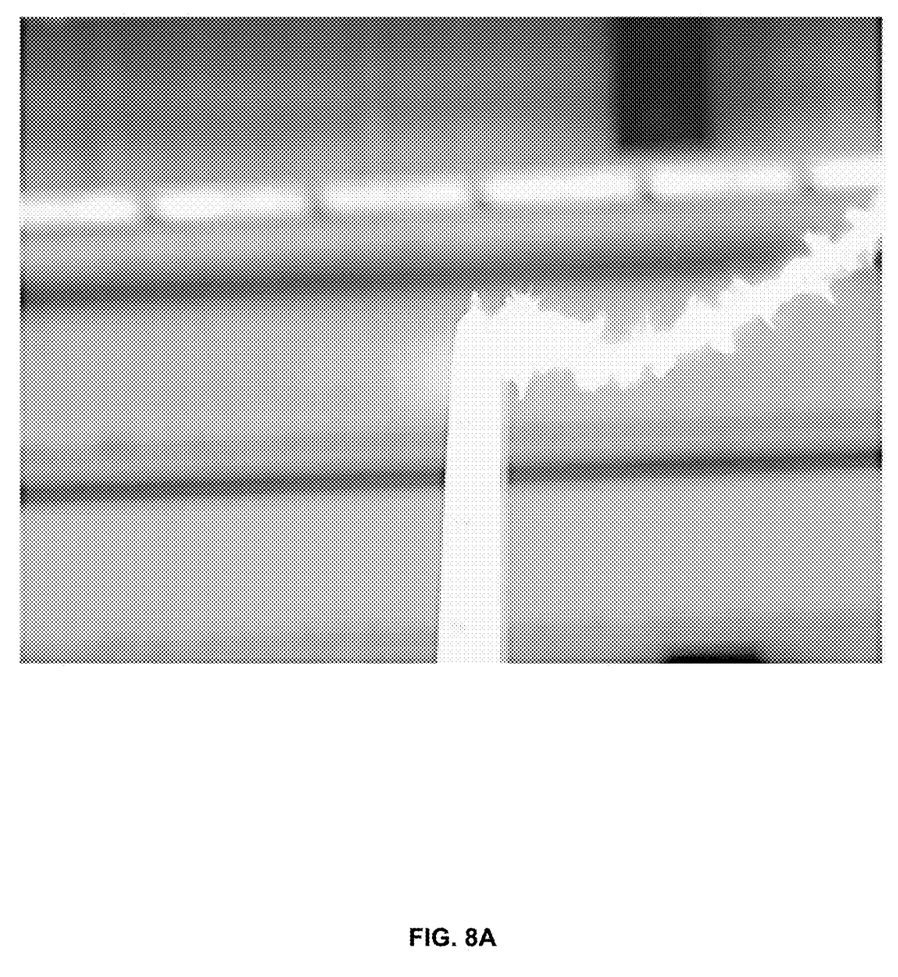
FIGS. 8A and 8B are photos showing the test results of FIGS. 7A and 7B.
Figure 8B:
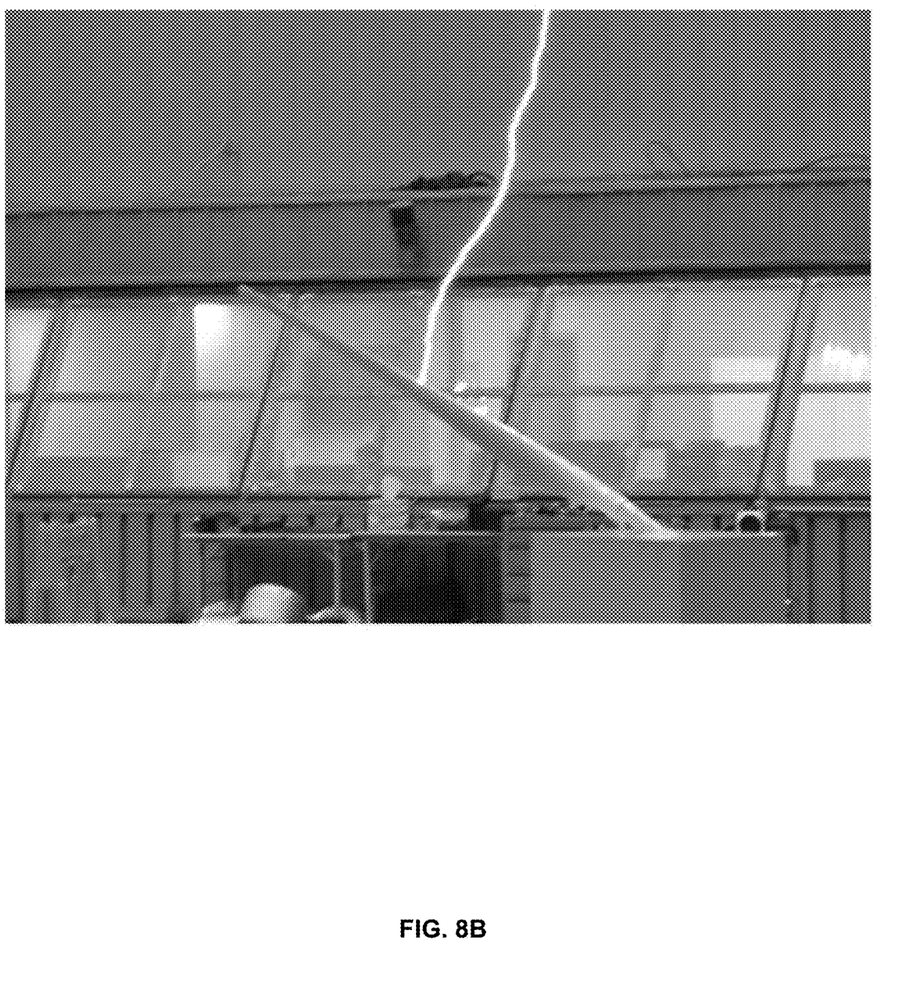

FIGS. 7A and 7B show a test in which a blade with an air-termination part is installed on an external electrode with a large ground plane according to the evaluation method described in the international standard IEC 61400-24 (pp. 108, 113-121), and then a switching impulse (SI) is applied to a flat electrode and a needle electrode to measure the rate of discharge to the blade air-termination part. In FIG. 7A, the electrode was spaced 50 cm apart from the blade, and in FIG. 7B, the electrode was spaced 50 cm inward based on the tip of the blade with the blade tilted at 60°. Both situations simulate vulnerabilities in lightning protection measures, and FIGS. 8A and 8B show the results of the tests.

The results of the above test on three types of blades (TS, TSE, TSM) are shown in [Table 1] below.

TABLE 1

|  |  | 0° | 60° |
|---|---|---|---|
| TS (edge receptor X, material FRP) | positive | 90% | 20% |
|  | negative | 100% | 100% |
| TSE (edge receptor O, material CFRP) | positive | 90% | 100% (edge 90%) |
|  | negative | 100% | 100% |
| TSM (edge receptor X, material CFRP) | positive | 90% | 0% |
|  | negative | 100% | 100% |

In this case, TS is a type of blade without the edge receptor 140 according to the present disclosure, and is made of FRP, an insulating material. TSE is a type of blade with the edge receptor 140 according to the present disclosure and is made of CFRP, a conductive material. TSM is a type of blade without the edge receptor 140 according to the present disclosure, and is made of CFRP, a conductive material.

The above test was conducted 10 times for each situation, as shown in [Table 1] above, it is confirmed that in the case of negative lightning, TSM, TSE, and TSM all detect lightning in the tip receptor, whereas in the case of positive lightning, they show vulnerability.

1-1) TS under positive polarity conditions where the blade rotation angle is 0°, among the 10 tests, there were 9 times that lightning was guided to the tip receptor and 1 time that the lightning was guided to the sides of the blade instead of the tip receptor. 1-2) In addition, TS under positive polarity conditions where the blade rotation angle is 60° (blade is tilted), among the 10 tests, there were 2 times that lightning was guided to the tip receptor and 8 times that the lightning was guided to the sides of the blade instead of the tip receptor.

2-1) TSE under positive polarity conditions where the blade rotation angle is 0°, among the 10 tests, there were 9 times that lightning was guided to the tip receptor and 1 time that the lightning was guided to the sides of the blade instead of the tip receptor. 2-2) In addition, TSE under positive polarity conditions where the blade rotation angle is 60° (blade is tilted), among the 10 tests, lightning was guided to the edge receptors 9 times and to the tip receptor 1 time. Therefore, the necessity of the edge receptors according to the present disclosure is confirmed.

3-1) TSM under positive polarity conditions where the blade rotation angle is 0°, among the 10 tests, there were 9 times that lightning was guided to the tip receptor and 1 time that the lightning was guided to the sides of the blade instead of the tip receptor. 3-2) In addition, TSM under positive polarity conditions where the blade rotation angle is 60° (blade is tilted), among the 10 tests, all 10 tests failed to induce lightning as the lightning was guided to the sides of the blade rather than the tip receptor. Considering that the blades of conventional large wind turbines are made of CFRP and have the same receptor structure as TSM, it is confirmed that the blades of conventional large wind turbines are vulnerable to positive lightning strikes.

According to the wind turbine blade 100 with a lightning protection receptor according to an embodiment of the present disclosure configured as described above, since the edge receptors 140 placed on the edge 112 of the blade body 110 are connected to the down conductor 150 that passes through the center of the internal space 113 of the blade body 110 to provide a structure in which lightning movement is induced, excellent lightning capture rate against positive lightning, which the sides of the blade are very vulnerable to, may be allowed for, and by limiting blade damage/coating peeling due to lightning strikes to a narrow area, post-repair/supplementary measures may be minimized.

As described above, although the wind turbine blade with a lightning protection receptor according to an embodiment of the present disclosure has been described and shown, this is merely an example, and those skilled in the art will be able to understand that various changes and modifications are possible without departing from the technical spirit of the present disclosure.

What is claimed is:

1. A wind turbine blade with a lightning protection receptor, the blade comprising:
   a blade body (110) disposed on a top of a tower of a wind turbine (1);
   a tip receptor (120) provided at an outer end in a longitudinal direction (L) of the blade body (110);
   side receptors (130) provided on front and rear surfaces (111*a*) and (111*b*) forming a side (111) of the blade body (110);
   edge receptors (140) provided on an edge (112) of the blade body (110); and
   a down conductor (150) located in an internal space (113) of the blade body (110), and to which the tip receptor (120), the side receptors (130), and the edge receptors (140) are connected,
   wherein the side receptors (130) are arranged at regular intervals within an area of a first arrangement distance (m) from the outer end in the longitudinal direction (L) of the blade body (110), whereas the edge receptors (140) are arranged at regular intervals within an area of a second arrangement distance (n) from a point spaced apart by the first arrangement distance (m) from the outer end in the longitudinal direction (L) of the blade body (110),
   wherein the second arrangement distance (n) area where the edge receptors (140) are provided has a larger value than the first arrangement distance (m) area where the side receptors (130) are provided, so that lightning is induced to the edge receptors (140).

2. The blade of claim 1, wherein the side receptors (130) and the edge receptors (140) are provided on a surface of the blade body (110) in a narrow area of less than a set size.

3. The blade of claim 1, wherein a number of the edge receptors (140) provided within the second arrangement distance (n) is set to be greater than a number of the side receptors (130) provided within the first arrangement distance (m).

4. The blade of claim 1, wherein the edge receptors (140) are arranged in a line at equal intervals on the edge (112) of the blade body (110).

* * * * *